US007339852B2

(12) United States Patent
Gordy et al.

(10) Patent No.: US 7,339,852 B2
(45) Date of Patent: Mar. 4, 2008

(54) SEISMIC ACQUISITION SYSTEM

(75) Inventors: Darrell Gordy, New Iberia, LA (US);
Bruce E. Cornish, Spring, TX (US);
Denis P. Schmitt, Katy, TX (US); Carl A. Robbins, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 10/804,669

(22) Filed: Mar. 19, 2004

(65) Prior Publication Data

US 2005/0207277 A1    Sep. 22, 2005

(51) Int. Cl.
*G01V 1/38* (2006.01)

(52) U.S. Cl. .................... 367/141; 367/15; 367/16; 367/144; 181/110; 181/118; 181/120

(58) Field of Classification Search ............ 367/14–16, 367/141, 144–146; 181/118, 120, 110
See application file for complete search history.

(56) References Cited

U.S. PATENT DOCUMENTS

| | | | | |
|---|---|---|---|---|
| 4,660,184 A | * | 4/1987 | Haukjem et al. ............. | 367/16 |
| 5,257,241 A | * | 10/1993 | Henderson et al. ........... | 367/15 |
| 5,469,404 A | * | 11/1995 | Barber et al. ................ | 367/23 |
| 5,917,160 A | * | 6/1999 | Bailey ........................ | 181/112 |
| 6,091,668 A | * | 7/2000 | Barber, Sr. .................. | 367/15 |
| 6,131,694 A | * | 10/2000 | Robbins et al. ............. | 181/105 |
| 6,175,809 B1 | | 1/2001 | Naville | |
| 6,301,193 B1 | * | 10/2001 | Martin et al. ................ | 367/16 |
| 2002/0092701 A1 | * | 7/2002 | Norris et al. ............... | 181/102 |
| 2004/0000446 A1 | * | 1/2004 | Barber, Sr. .................. | 181/120 |
| 2004/0228214 A1 | * | 11/2004 | Tulett .......................... | 367/15 |

OTHER PUBLICATIONS

Detrick, et al. "DEOS Moored Buoy Observatory Design Study." Aug. 2000.*

* cited by examiner

*Primary Examiner*—Jack Keith
*Assistant Examiner*—Scott A Hughes
(74) *Attorney, Agent, or Firm*—Conley Rose, PC

(57) ABSTRACT

A seismic acquisition system comprising a remote-controlled buoy for conducting seismic acquisition operations. The buoy comprises an operating system for operating a seismic wave production device on the buoy, a placement system, a communications system, and dynamic position locating system. The seismic acquisition system also comprises a remote control system for controlling the buoy systems. The seismic acquisition system also comprises receivers for receiving the seismic wave and generating a data signal indicative of the received seismic wave. The seismic acquisition system operates by controlling the placement system with the remote control system to position the buoy and then controlling the operating system with the remote control system to produce a seismic wave from the seismic wave production device. The receivers then receive the seismic wave and generate a data signal indicative of the seismic wave. The time of producing the seismic wave as well as the position of the buoy at the time of production are then analyzed with the data signal by a data processor.

49 Claims, 5 Drawing Sheets

SEISMIC ACQUISITION SYSTEM

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND

During the drilling, completion, and production of oil and gas wells, it is often necessary to engage in ancillary operations, such as monitoring the operability of equipment used during the drilling process or evaluating the production capabilities of formations intersected by the wellbore. For example, after a well or well interval has been drilled, zones of interest are often tested to determine various formation properties such as permeability, fluid type, fluid quality, formation pressure, and formation pressure gradient. These tests determine whether commercial exploitation of the intersected formations is viable.

Other formation tests include seismic exploration operations. The field of seismology focuses on the use of artificially generated elastic waves to locate mineral deposits such as hydrocarbons, ores, water, and geothermal reservoirs. Exploration seismology provides data that, when used in conjunction with other available geophysical, borehole, and geological data, can provide information about the structure and distribution of rock types and contents.

Seismic exploration generally involves a seismic wave source creating and imparting vibrational energy into the ground. That energy may be in the form of a relatively short duration, large amplitude "impulse", or longer duration, lower amplitude vibrations. The energy imparted to the ground propagates generally downward and reflects off various subsurface structures, such as interfaces between different rock formations. The reflected energy waves are then detected by receivers called "geophones". The term "geophone" is used throughout this disclosure to refer to any type of seismic detector. The receivers may be located either on a drill string, a wireline tool, the production casing, or even in the annulus between the casing and the borehole wall. The receivers may also be deployed in a large array on the surface of the earth.

When the waves are detected by a receiver, the geophone records a "seismogram". Seismograms are commonly recorded as digital samples representing the amplitude of a received seismic signal as a function of time. With multiple geophones, the digital samples can be formed into a 3-dimensional array with each sample in the array representing the amplitude of the seismic signal as a function of time (t) and position on the earth (x,y).

The collection of seismic samples as a function of time (t) for one position in the earth is referred to as a "seismic trace." The collection of seismic traces forming an array are commonly referred to as "seismic data volumes." A seismic data volume depicts the subsurface layering of a portion of the earth. It is the principal tool that a geophysicist uses to determine the nature of the earth's subsurface formations. The seismic data volume can be studied either by plotting it on paper or displaying it on a computer monitor. A geophysicist can then interpret the information. When displaying the seismic data volume along a principle direction, crosslines, inlines, time slices, or horizon slices can be made. The seismic data volume can be mathematically processed in accordance with known techniques to make subtle features in the seismic data more discernible. The results of these processing techniques are known as seismic "attributes." The images may also be compared over a period of time to follow the evolution of the subsurface formation over time.

An example of a conventional method of seismic exploration referred to as VSP consists in coupling the wall of a well to a string of seismic receivers placed at intervals along a conventional logging cable in order to pick up the waves reflected by the discontinuities of the surrounding formation in response to the waves emitted by a source outside the well. Seismic sources are then installed with different offsets and/or azimuths in relation to the well for creating the seismic waves.

Onshore, the sources can be readily placed in contact with the ground or at the bottom of a cased hole deep enough for the source to be in contact with the formation below the weathered layer. Several independent sources coupled with the ground with different offsets in relation to the well can be successively activated for each position of the VSP logging tool.

Offshore, in order to carry out similar multi-offset, multi-azimuth VSP type exploration sessions, a boat is used to tow an immersed impulsive source (air, water or explosive gun, marine vibrator, etc.) through a zone around the well to a succession of "shooting" positions and to carry out, in each one of them, a succession of emission-reception cycles. Several workboats, each towing a marine source or multiple sources, may also be used to trigger the sources in sequence for each position of the logging tool.

BRIEF DESCRIPTION OF THE DRAWINGS

For a more detailed description of the embodiments, reference will now be made to the following accompanying drawings.

DETAILED DESCRIPTION OF THE EMBODIMENTS

The drawings and the description below disclose specific embodiments of the present invention with the understanding that the embodiments are to be considered an exemplification of the principles of the invention, and are not intended to limit the invention to that illustrated and described. Further, it is to be fully recognized that the different teachings of the embodiments discussed below may be employed separately or in any suitable combination to produce desired results.

Figure 1:
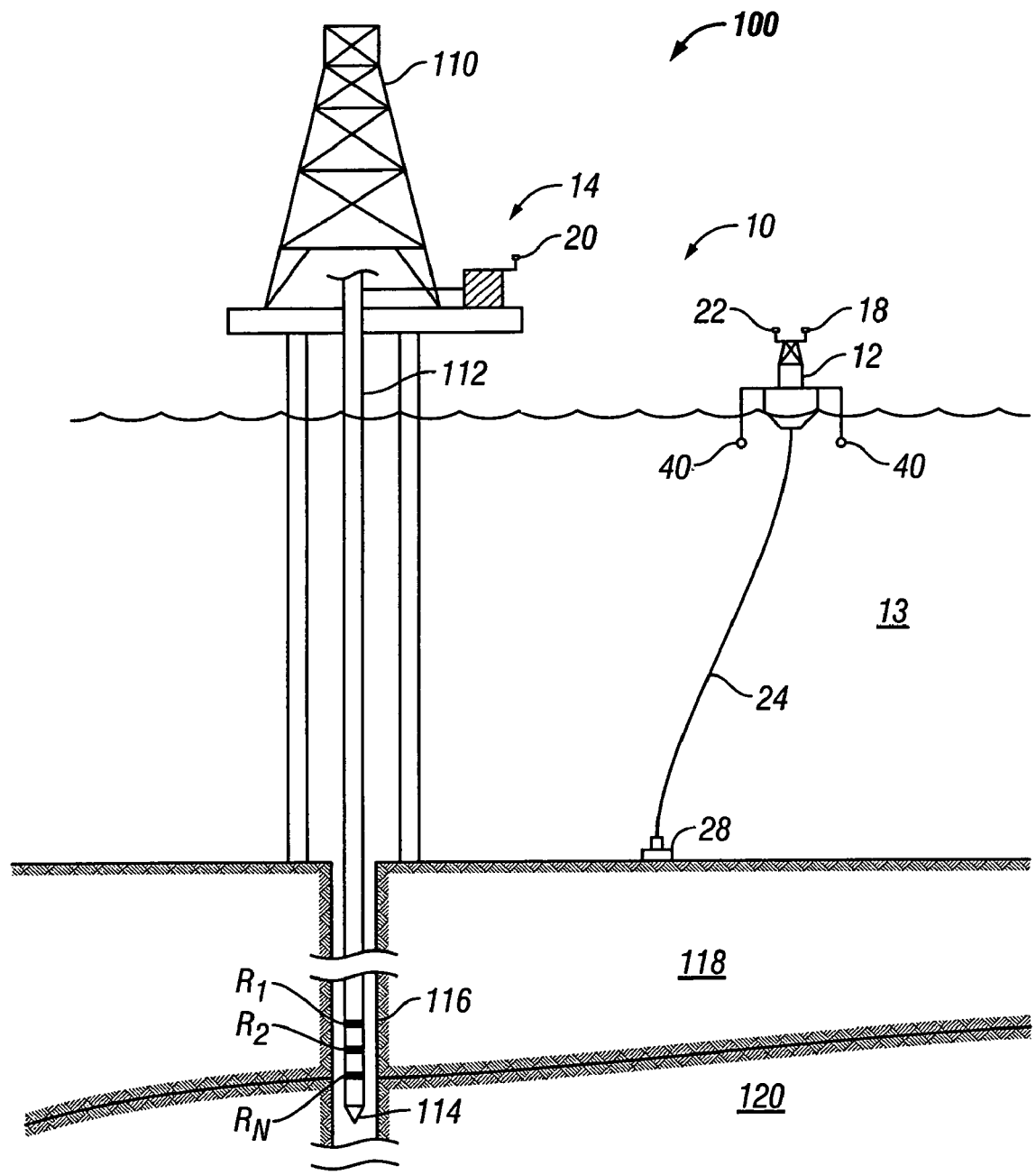
FIG. 1 shows an embodiment of the seismic acquisition system.

FIG. 1 shows a well drilling system 100 that includes a derrick 110 with an attached drill string 112. To drill a well, a drill bit 114 creates a wellbore 116 through the surrounding formation 118, which may also include formation boundaries corresponding to, for example, an over-pressurized zone 120.

To acquire seismic data on the formation 118 or 120, a seismic acquisition system 10, comprising a buoy 12 in a body of water 13, a remote control system 14, and seismic receivers R1, R2, . . . , Rn, is used. The embodiment of the seismic acquisition system 10 shown in FIGS. 1, 2, and 3 operates by communicating between the remote control system 14 and a communications system 16 on the buoy 12. The communications system 16 on the buoy 12 transmits a monitoring signal to the remote control system 14 for monitoring the buoy 12. The remote control system 14 also transmits an operating signal to the buoy 12 for operating the buoy 12. The remote control system 14 and communications system 16 communicate through telemetry systems. The telemetry systems may comprise, for example, digital radio systems communicating through an antenna 18 on the buoy 12 and an antenna 20 on the remote control system 14. The telemetry systems may also comprise any other suitable telemetry means, such as a satellite data transmission system.

One of the monitoring signals the buoy 12 sends to the remote control system 14 is a position signal generated by dynamic position locating system (not shown) on the buoy 12. The dynamic position locating system may be a GPS system that uses antenna 22 and satellite signals to generate the position signal indicating the position of the buoy 12. The remote control system 14 uses the position signal when controlling a placement system to position the buoy 12. In the embodiment shown in FIGS. 1, 2, and 3, the placement system comprises an anchor line 24 attached at a first end to the buoy 12 through a winch 26 and at a second end to an anchor 28. The placement system may also comprise any other suitable means for positioning the buoy 12, such as a motor and propeller or jet. A power system (not shown) on the buoy 12 powers the winch 26. The power system may be any suitable power system, such as a solar-charged battery. The remote control system 14 sends operating signals through the communications system 16 to operate the placement system and thus position the buoy.

Using the position signal generated by the dynamic position locating system, the remote control system 14 sends an operating signal comprising a placement signal to the buoy 12 to operate the placement system. Operating the winch 26 controls the distance from the buoy 12 to the anchors 28. The remote control system 14 thus selectively positions the buoy 12 by. controlling the length of the anchor line 24 by selectively operating the winch 26 on the buoy 12. The remote control system 14 may send an operating signal to designate single positions for the buoy 12 or may direct a movement path for the buoy 12 through the body of water 13.

Once in position, the buoy 12 may be used to conduct seismic acquisition operations. The remote control system 14 sends an operating signal to the buoy 12 that activates an operating system 30. The operating system operates a seismic wave production device on the buoy 12.

Figure 2:
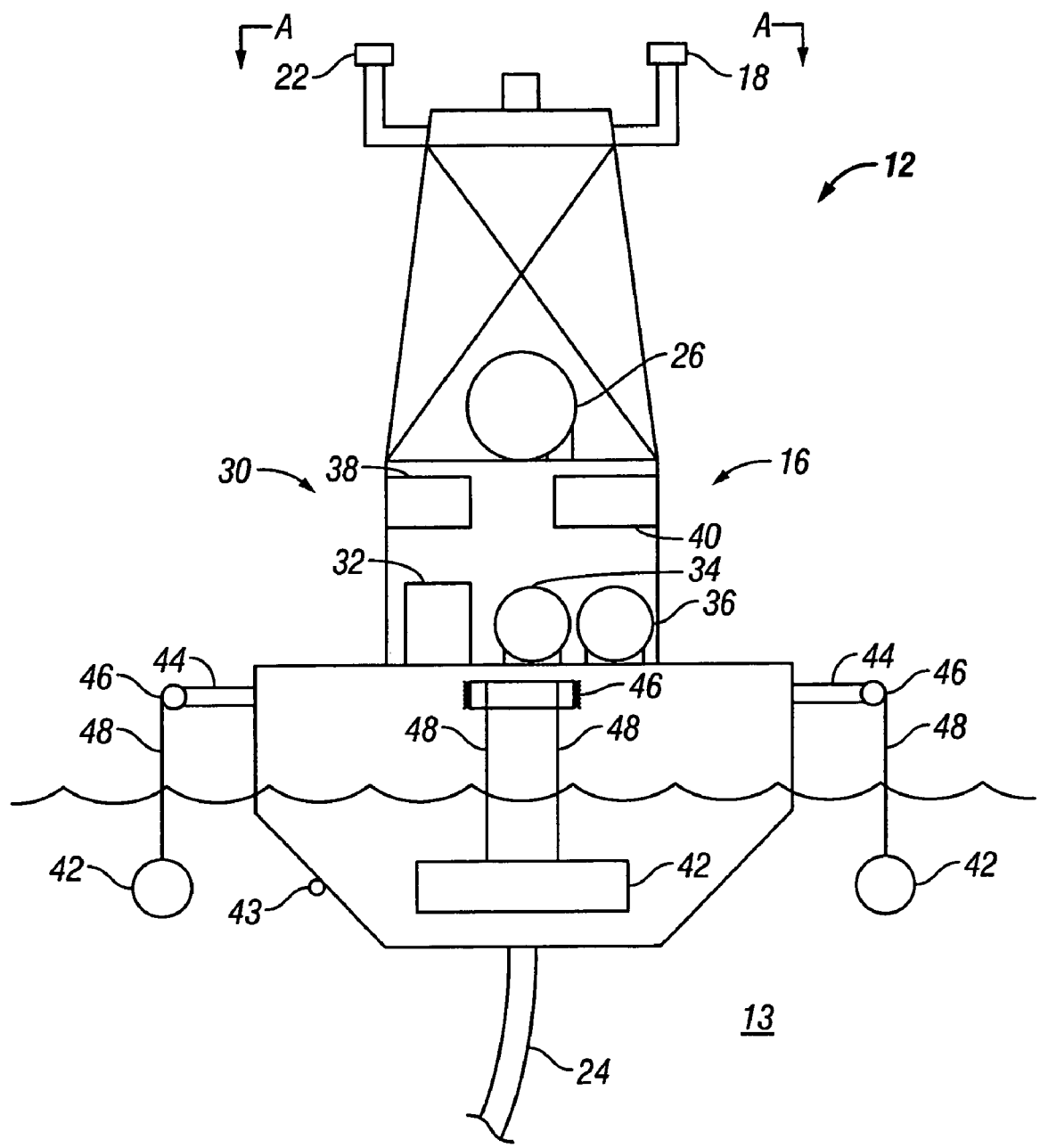
FIG. 2 shows an embodiment of the source buoy of the seismic acquisition system in FIG. 1.
Figure 3:
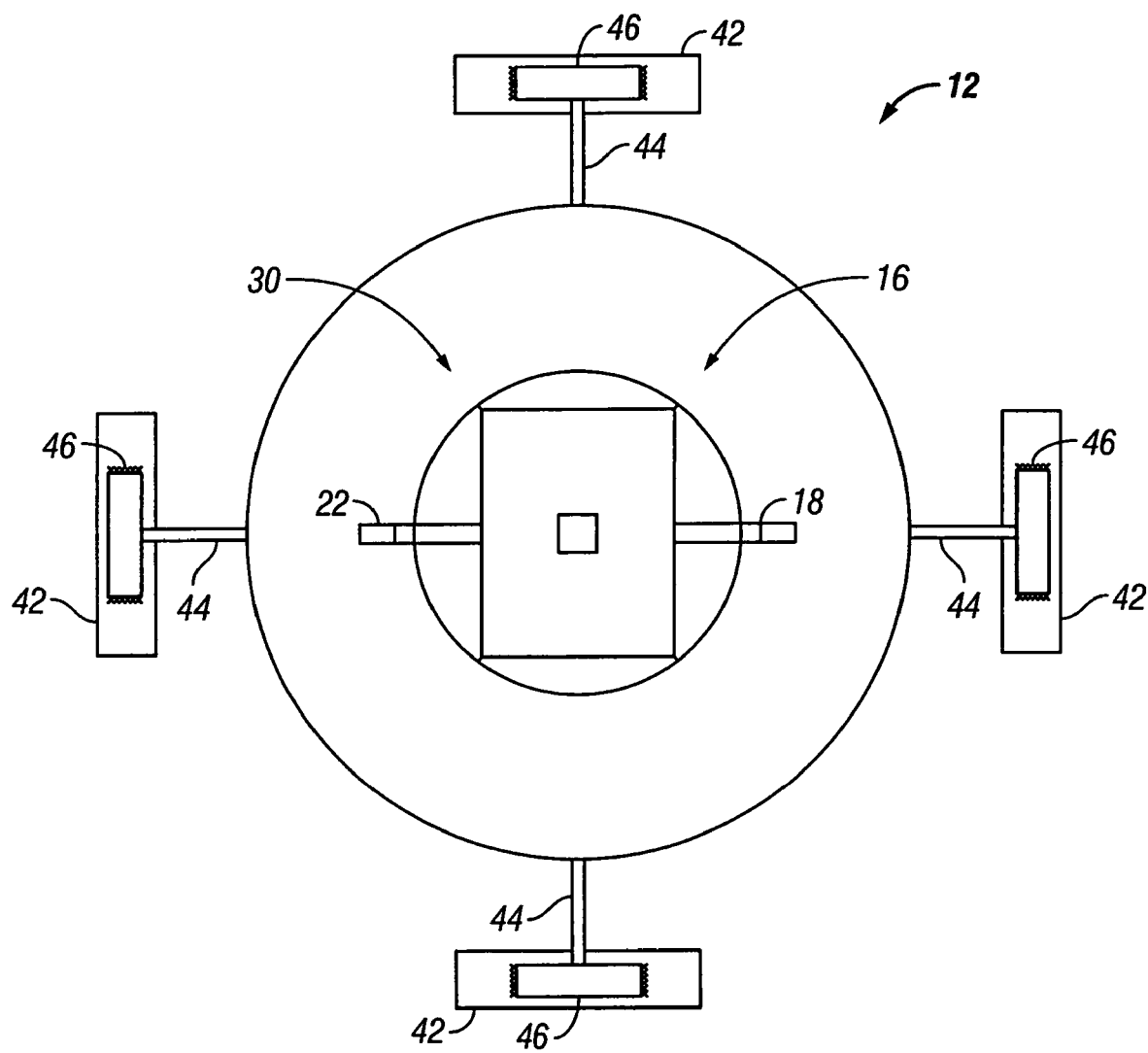
FIG. 3 shows a top view of the source buoy in plane A-A of FIG. 2.

For example, the operating system 30 comprises a compressor 32 for charging gas storage vessels 34 and 36. The operating system 12 also comprises appropriate electronics 38 and controls 40 for operating the compressor 32 and the storage vessels 34 and 36. The power system also supplies power to the operating system 30. Once the storage vessels 34 and 36 are charged, the operating system 30 may release the pressurized gas from the gas storage vessels 34 and 36 with an appropriate operating signal from the remote control system 14. The released gas flows through appropriate supply lines to activate air guns 42. The air guns 42 are mounted on arms 44 extending from the buoy 12. Winches 46 control the position of the air guns 42 using lines 48. The power supply system supplies power to the winches 46 and the operating system 30 operates the winches 46 to control the position of the air guns 42. The air guns 42, as shown in FIGS. 2 and 3, are placed at ninety degrees to each other. The guns 42 may also be mounted in any other suitable configuration and may also be set-mounted or rotatably mounted. The air guns 42 may be sleeve air guns or any other suitable type of air gun or seismic wave production device. Additionally, only one or more guns may need to be used depending on the formation to be examined. Once the air guns 42 are lowered into position in the body of water, the operating system 30 releases the pressurized gas in the storage vessels 34 and 36 to produce a seismic wave from the air guns 42.

The embodiment described and shown in FIGS. 1, 2, and 3 is an example only and may be modified depending on the desired operating characteristics of the buoy 12. For example, the air guns 42, gas storage vessels 34 and 36, and compressor 32 may be replaced with any other suitable means for producing a seismic wave. Additionally, there may only need to be one, or any number of air guns 42. The operating system 30 may also be configured in any suitable manner as to control the production of the seismic wave from the seismic wave production device. For example, the operating system may be a system for activating the seismic wave production device such as that described in U.S. Pat. Nos. 5,184,329 and 5,200,927, hereby incorporated herein by reference for all purposes.

Through the entire operation, the operating system 30, the placement system, and the dynamic position locating communicate a monitoring signal with the remote control system 14. The monitoring signal communicates information on the power supply system, the operating system, the position of the buoy 12, and the placement system, and the seismic production device. The information can include whether the compressor 32 is running, the pressure of the gas storage vessels 34 and 36, the precise time when the air guns 42 are fired, as well as other operating information. The buoy 12 may alternatively comprise one or more seismic receivers 43 for monitoring the seismic wave produced by the air guns 42. The seismic receiver 43 may comprise a monitor hydrophone. The seismic receiver 43 produces a signal of the seismic wave taken at the buoy 12 as a function of time. The seismic receiver signal may then be included in the monitoring signal sent to the remote control system 14. The monitoring signal also relays positional information from the dynamic positioning system so the position of the buoy 12 is known at the time of producing the seismic wave. All or part of the monitoring signal may be sent real-time such that no recording devices are needed on the buoy 12. The buoy 12 may also comprise recording devices for recording the monitoring signal to be sent to the monitoring system 14 at a later time.

As shown in FIG. 1, a set of seismic receivers R1, R2, . . . , Rn, such as multi-axis geophones, for example, and/or accelerometers and/or hydrophones, is lowered into the well 116 on drill string 112. Each seismic receiver Rn comprises, for example, a mono-axis or a multi-axis pickup such as a triphone, but may be any suitable type of receiver for receiving seismic waves. The receivers R1, R2, . . . , Rn can be encased in one or more well sondes as part of the drill string 112 and lowered into the well 116 from the rig 110. The receivers R1, R2, . . . , Rn can also be placed in the drill string 112 in close proximity to the bit 114 and/or stabilizers, conventionally interposed along the drill string 112, so as to guarantee the best possible coupling of the receivers R1, R2, . . . Rn with the surrounding formations 118, 120. It should be appreciated that the embodiment described involves receivers on a drill string. However, the receivers R1, R2, . . . , Rn may also be lowered into the borehole 116 on a wireline tool or a work string. The receivers R1, R2, . . . , R3 may also be permanently installed in the wellbore 116 in production casing or the like. The receivers R1, R2, . . . , R3 may also be installed in the annulus between the casing and the wall of the borehole 116. Alternatively, instead of using multiple receivers, there may also only need to be one receiver used.

When the remote control system 14 triggers the air guns 40, the location of which relative to the receivers R1, R2, . . . , R3 is known, the air guns 40 release a seismic wave into the formations 118, 120. The seismic waves travel through the formations 118, 120 and are received by the various receivers R1, R2, . . . , R3. The receivers R1, R2, . . . , R3 then record seismograms representing the amplitude of a received seismic signal as a function of time. The collection of seismic samples are then compiled into seismic trace to form seismic data volumes on the formations 118, 120.

The data recorded by the receivers R1, R2, . . . , Rn may be stored by any suitable means, such as a tool integrated with the drill string 112 for retrieval and processing at a later time. The data may also be relayed through a receiver telemetry system (not shown) to data processors on the rig 110 or any suitable location. The receiver telemetry system may be in the form of signal transmission lines in the drill string 112 itself or a mud-pulse telemetry system. The receiver telemetry system may also be any suitable telemetry system for transmitting the receiver data to the data processors. The data processors may also be any suitable signal processors for seismic data from the receivers R1, R2, . . . , R3 and may include digital mapping software for generating a 3-D image of the formation 118, 120 from the receiver R1, R2, . . . , Rn data.

The buoy 12 also comprises features for the servicing, maintaining, and transportation of the buoy 12. For example, the buoy 12 may be picked up by a boat by pulling in the anchor line 24 with the winch 26 and then using attachments to either tow the buoy 12 to a new location or lift the buoy onto the boat for transportation to a new location. The buoy 12 may also include safety and location lighting. For boarding and working on the buoy 12, the buoy 12 may also comprise a personnel loading deck as well as a walkway and a hand rail with harness attachments.

Figure 4:
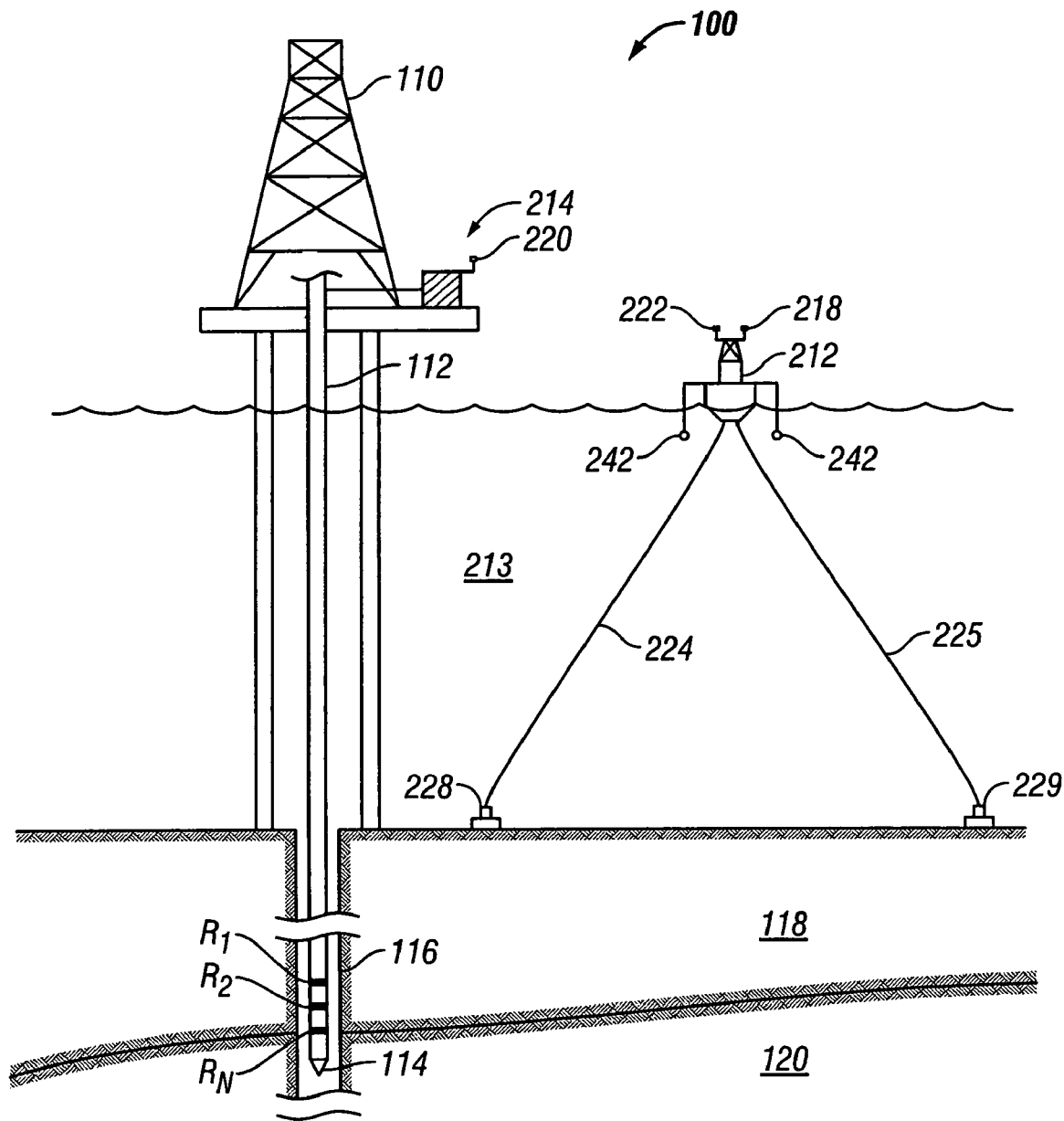
FIG. 4 shows another embodiment of the seismic acquisition system.
Figure 5:
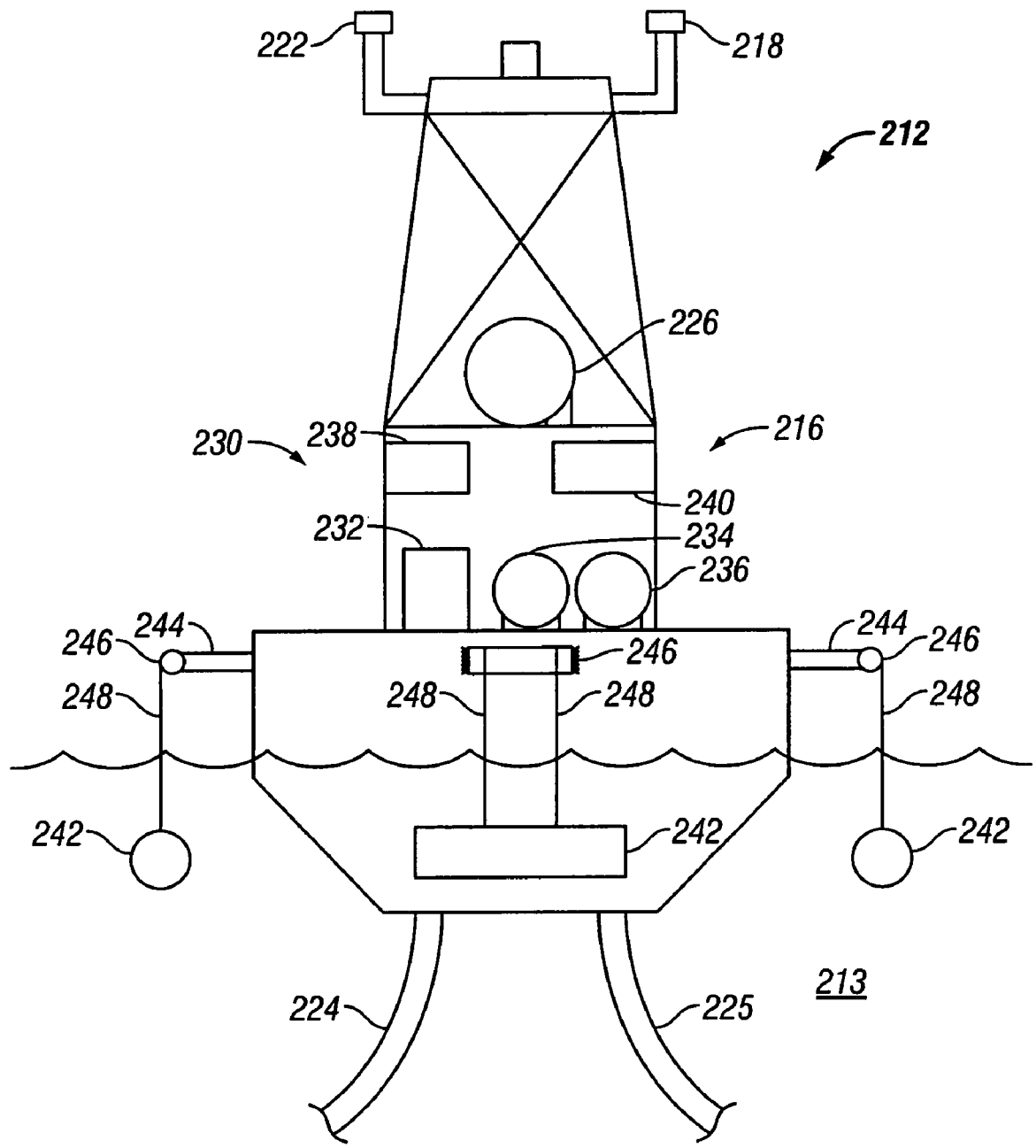
FIG. 5 shows an embodiment of the source buoy of the seismic acquisition system in FIG. 4.

FIGS. 4 and 5 show another embodiment 210 of a seismic acquisition system, comprising a buoy 212, a remote control system 214, and seismic receivers R1, R2, . . . , R3. The embodiment 210 of the seismic acquisition system shown in FIGS. 4 and 5 operates in a similar manner as the seismic acquisition system 10 and some of the details of the operation will not be repeated. Like parts are given similar nomenclature, with the reference numbers running in the 200's. The seismic acquisition system 210 operates by communicating between the remote control system 214 and a communications system 216 on the buoy 212. The communications system 216 on the buoy 212 transmits a monitoring signal to the remote control system 214 for monitoring the buoy 212. The remote control system 214 also transmits an operating signal to the buoy 212 for operating the buoy 212.

One of the monitoring signals the buoy 212 sends to the remote control system 214 is a position signal generated by dynamic position locating system (not shown) on the buoy 212. The dynamic position locating system may be a GPS system that uses antenna 22 and satellite data signals to generate the position signal. The remote control system 214 uses the position signal when controlling a placement system to position the buoy 212. In the embodiment shown in FIGS. 4 and 5, the placement system comprises an anchor line 224 attached at a first end to the buoy 212 through a winch 226 and at a second end to an anchor 228. A power system (not shown) on the buoy 212 powers the winch 226. The power system may be any suitable power system, such as a solar-charged battery. The placement system also comprises a second anchor line 225 attached at a first end to the buoy 212 through the winch 226 and at a second end to an anchor 229. The second anchor line 225 may also be attached at the first end to a second winch on the buoy 212.

Using the position signal generated by the dynamic position locating system, the remote control system 214 sends an operating signal comprising a placement signal to the buoy 212 to operate the placement system. Operating the winch 226 controls the distances from the buoy 212 to the anchors 228 and 229. The remote control system 214 thus selectively positions the buoy 212 by controlling the length of the anchor lines 224 and 225 by selectively operating the winch 226 on the buoy 212. The remote control system 214 may send an operating signal to designate single positions for the buoy 212 or may direct a movement path for the buoy 212 through the body of water 13.

Once in position, the buoy 212 may be used to conduct seismic acquisition operations as described above for the embodiment depicted in FIGS. 1, 2, and 3.

Numerous changes may be made to both the embodiments depending on the design parameters set for the data acquisition. For example, any number of buoys 12 or 212 may be used for the seismic acquisition process. Additionally, the seismic data recorded by the receivers R1, R2, . . . , Rn may be stored and processed in any suitable manner to evaluate the formations 118 and 120. Additionally, the air guns 42 and 242 may be mounted in a set position or may be allowed to rotate.

While specific embodiments have been shown and described, modifications can be made by one skilled in the art without departing from the spirit or teaching of this invention. The embodiments as described are exemplary only and are not limiting. Many variations and modifications are possible and are within the scope of the invention. Accordingly, the scope of protection is not limited to the embodiments described, but is only limited by the claims that follow, the scope of which shall include all equivalents of the subject matter of the claims.

What is claimed is:

1. A seismic source system comprising:
 a buoy comprising:
  an operating system;
  a seismic wave production device operated by the operating system;
  a placement system;
  a wireless buoy communications system; and
  a dynamic position locating system generating a position signal indicating the location of the buoy;
 a wireless remote control system in wireless remote communication with the buoy through the wireless buoy communications system; and
 where the placement system further comprises an anchor winch attached to an anchor by an anchor line, the anchor winch being controlled by the wireless remote control system such that the buoy is remotely positionable.

2. The seismic source system of claim 1 where the buoy further comprises the seismic wave production device position being controlled by a winch engaged with an arm extending from the buoy.

3. The seismic source of claim 1 where the buoy further comprises more than one seismic wave production device, each seismic wave production device position being controlled by a winch engaged with an arm extending from the buoy.

4. The seismic source device of claim 1 where the seismic wave production device comprises an air gun.

5. The seismic source device of claim 1 where the operating system further comprises an air storage vessel charged by a compressor controlled by a controller, the seismic wave production device comprising an air gun powered by the air storage vessel.

6. The seismic source device of claim 1 where the placement system further comprises more than one anchor winch attached to an anchor by an anchor line, the anchor winches being controlled by the wireless remote control system.

7. The seismic source device of claim 1 where the wireless buoy communications system further comprises a wireless buoy telemetry system in wireless remote communication with the wireless remote control system.

8. The seismic source device of claim 1 where the wireless remote control system further comprises a wireless remote control telemetry system in wireless communication with the wireless buoy communications system.

9. The seismic source device of claim 1 where the dynamic position locating system further comprises a GPS system.

10. The seismic source device of claim 1 where the buoy further comprises an operating sensor.

11. The seismic source device of claim 1 where the operating sensor comprises a hydrophone.

12. A method of generating a seismic wave comprising:
controlling a placement system on a buoy with a wireless remote control system to remotely position the buoy, the wireless remote control system communicating with the buoy though a wireless buoy communications system;
controlling an operating system on the buoy with the wireless remote control system;
operating a seismic wave production device on the buoy with the operating system to produce a seismic wave; and
wherein the placement system comprises an anchor winch attached to an anchor by an anchor line, the anchor winch being controlled by the wireless remote control system such that the buoy is remotely positionable.

13. The method of claim 12 further comprising:
generating a position signal with a dynamic position device on the buoy indicating the position of the buoy;
transmitting the position signal through the wireless buoy communications system to the wireless remote control system;
analyzing the position signal with the wireless remote control system; and
transmitting a placement signal from the wireless remote control system to the wireless buoy communications system to operate the placement system and move the buoy to a selected position.

14. The method of claim 13 further comprising:
transmitting a signal indicative of the seismic wave as a function of time from the buoy to the wireless remote control system using the wireless buoy communications system; and
transmitting the position signal at the time of generating the seismic wave through the wireless buoy communications system to the wireless remote control system.

15. The method of claim 12 further comprising operating the winch on the buoy connected to the anchor by the anchor line to remotely position the buoy.

16. The method of claim 15 further comprising operating more than one winch on the buoy connected to an anchor by an anchor line to remotely position the buoy.

17. The method of claim 12 where controlling the operating system further comprises:
charging a gas storage vessel on the buoy with a compressor;
producing a seismic wave by releasing the gas from the gas storage vessel through an air gun on the buoy.

18. A seismic acquisition system comprising:
a buoy comprising:
an operating system;
a seismic wave production device operated by the operating system;
a placement system;
a wireless buoy communications system;
a dynamic position locating system generating a position signal indicating the location of the buoy; and
a wireless remote control system in wireless communication with the buoy through the wireless buoy communications system;
where the placement system further comprises an anchor winch attached to an anchor by an anchor line, the anchor winch being controlled by the wireless remote control system such that the buoy is remotely positionable; and
a seismic receiver located in a wellbore.

19. The seismic acquisition system of claim 18 where the seismic receiver is located on a drill string.

20. The seismic acquisition system of claim 18 where the seismic receiver is located on a wireline tool.

21. The seismic acquisition system of claim 18 where the seismic receiver is located on a well casing.

22. The seismic acquisition system of claim 18 where the seismic receiver is located on a work string.

23. The seismic acquisition system of claim 18 where the seismic receiver is located in the annulus between a well casing and the borehole wall.

24. The seismic acquisition system of claim 18 where the seismic receiver is in communication with a data signal processor through a receiver telemetry system.

25. The seismic acquisition system of claim 18 where the buoy further comprises the seismic wave production device position being controlled by a winch engaged with an arm extending from the buoy.

26. The seismic acquisition system of claim 18 where the buoy further comprises more than one seismic wave production device, each seismic wave production device position being controlled by a winch engaged with an arm extending from the buoy.

27. The seismic acquisition system of claim 18 where the seismic wave production device comprises an air gun.

28. The seismic acquisition system of claim 18 where the operating system further comprises an air storage vessel charged by a compressor controlled by a controller, the seismic wave production device comprising an air gun powered by the air storage vessel.

29. The seismic acquisition system of claim 18 where the placement system further comprises more than one anchor winch attached to an anchor by an anchor line, the anchor winches being controlled by the remote control system.

30. The seismic acquisition system of claim 18 where the wireless buoy communications system further comprises a wireless buoy telemetry system in wireless remote communication with the wireless remote control system.

31. The seismic acquisition system of claim 18 where the wireless remote control system further comprises a wireless remote control telemetry system in wireless communication with the wireless buoy communications system.

32. The seismic acquisition system of claim 18 where the dynamic position locating system further comprises a GPS system.

33. The seismic acquisition system of claim 18 where the buoy further comprises an operating sensor.

34. The seismic acquisition system of claim 18 where the operating sensor comprises a hydrophone.

35. A method of acquiring seismic data on an underground formation comprising:
  controlling a placement system on a buoy with a wireless remote control system to remotely position the buoy, the wireless remote control system communicating with the buoy though a wireless communications system on the buoy;
  controlling an operating system on the buoy with the wireless remote control system;
  operating a seismic wave production device on the buoy with the operating system to produce a seismic wave;
  transmitting a monitoring signal from the buoy to the wireless remote control system using the wireless communications system, the monitoring signal comprising the signature of the seismic wave as a function of time;
  transmitting a position signal from a dynamic position device on the buoy through the wireless communications system to the remote control system, the position signal indicating the position of the buoy at the time of generating the seismic wave;
  receiving the seismic wave with a seismic receiver located in a borehole;
  generating a data signal indicative of the received seismic wave; and
  wherein the placement system comprises an anchor winch attached to an anchor by an anchor line, the anchor winch being controlled by the wireless remote control system such that the buoy is remotely positionable.

36. The method of claim 35 further comprising:
  generating a position signal with a dynamic position device on the buoy indicating the position of the buoy;
  transmitting the position signal through the wireless communications system to the wireless remote control system;
  analyzing the position signal with the wireless remote control system;
  transmitting a placement signal from the wireless remote control system to the wireless communications system on the buoy to operate the placement system and move the buoy to a selected position.

37. The method of claim 35 further comprising operating the winch on the buoy connected to the anchor by the anchor line to remotely position the buoy.

38. The method of claim 37 further comprising operating more than one winch on the buoy connected to an anchor by an anchor line to remotely position the buoy.

39. The method of claim 35 further comprising transmitting the data signal through a receiver telemetry system to a data signal processor.

40. The method of claim 39 further comprising analyzing the monitoring signal, the position signal, and the data signal with the data signal processor.

41. The method of claim 35 where controlling the operating system further comprises:
  charging a gas storage vessel on the buoy with a compressor;
  producing a seismic wave by releasing the gas from the gas storage vessel through an air gun on the buoy.

42. The method of claim 35 further comprising the receiver being located on a drill string and transmitting the data signal from the receiver through a telemetry system to a data signal processor.

43. The method of claim 35 further comprising the receiver being located on a wireline tool and transmitting the data signal from the receiver through a telemetry system to a data signal processor.

44. The method of claim 35 further comprising the receiver being located on a well casing and transmitting the data signal from the receiver through a telemetry system to a data signal processor.

45. The method of claim 35 further comprising the receiver being located on a workstring and transmitting the data signal from the receiver through a telemetry system to a data signal processor.

46. The method of claim 35 further comprising the seismic receiver being located in the annulus between a well casing and the borehole wall and transmitting the data signal from the receiver through a telemetry system to a data signal processor.

47. The method of claim 35 further comprising producing the seismic wave, transmitting the monitoring signal, transmitting the position signal, receiving the seismic wave with a seismic receiver, and generating the data signal indicative of the received seismic wave during wellbore drilling operations.

48. The method of claim 35 further comprising producing the seismic wave, transmitting the monitoring signal, transmitting the position signal, receiving the seismic wave with a seismic receiver, and generating the data signal indicative of the received seismic wave during wellbore completion operations.

49. The method of claim 35 further comprising producing the seismic wave, transmitting the monitoring signal, transmitting the position signal, receiving the seismic wave with a seismic receiver, and generating the data signal indicative of the received seismic wave during wellbore production operations.

* * * * *